July 10, 1956     G. J. MACH     2,753,947
FORWARD MOUNTED TRUCK CAB WITH A MOVABLE SEAT
Filed Aug. 31, 1954     2 Sheets-Sheet 1
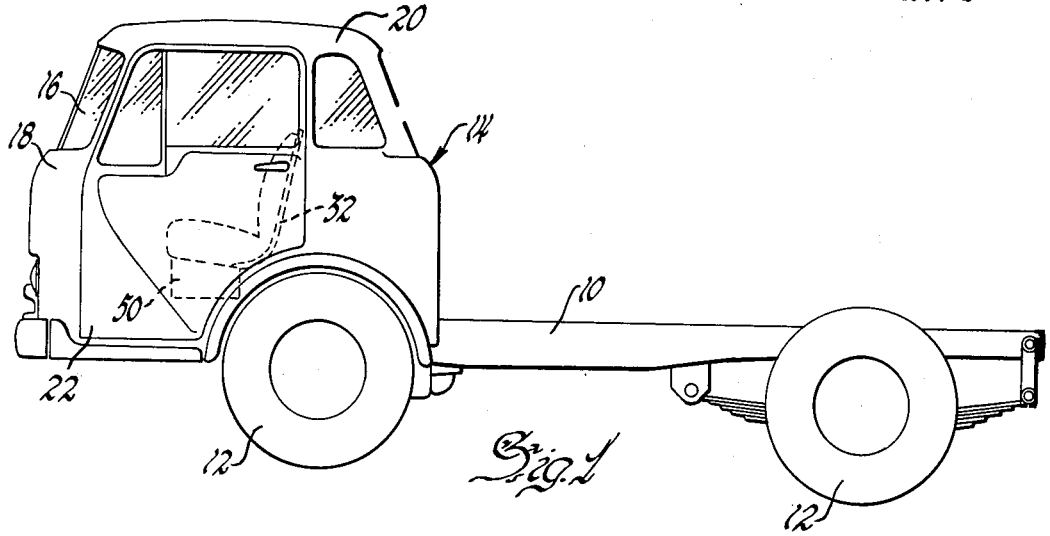
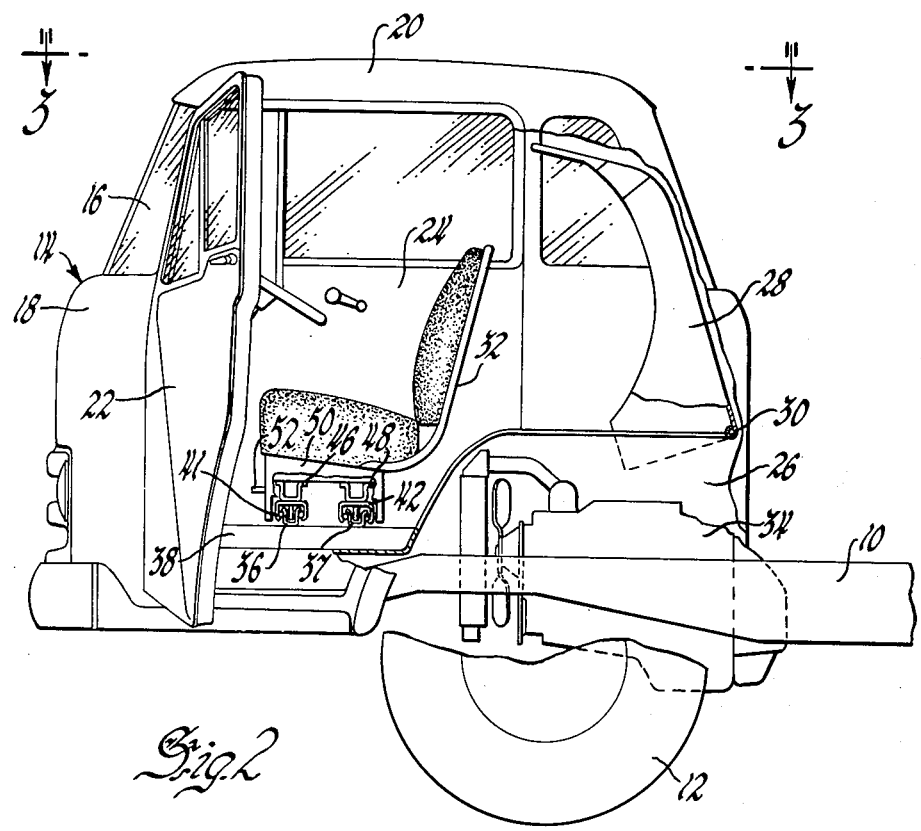
INVENTOR
George J. Mach
BY Paul Fitzpatrick
ATTORNEY July 10, 1956 G. J. MACH 2,753,947
FORWARD MOUNTED TRUCK CAB WITH A MOVABLE SEAT
Filed Aug. 31, 1954 2 Sheets-Sheet 2

INVENTOR
George J. Mach
BY
Paul Fitzpatrick
ATTORNEY

United States Patent Office 2,753,947
Patented July 10, 1956

2,753,947

FORWARD MOUNTED TRUCK CAB WITH A MOVABLE SEAT

George J. Mach, Berkley, Mich., assignor to General Motors Corporation, Detroit, Mich., a corporation of Delaware Application August 31, 1954, Serial No. 453,312

5 Claims. (Cl. 180—89)

This invention relates to a truck cab construction, and more particularly to a cab construction in a cab-over-engine truck.

One feature of the invention is that it provides an improved truck cab construction; another feature of the invention is that it provides a novel and improved means of access to the engine compartment in a cab-over-engine truck; a further feature of the invention is that the operator's seat, which is mounted forwardly of the engine compartment in the truck cab, is movable tranversely of the cab to provide access to the engine compartment; still another feature of the invention is that track means are provided in the cab for supporting the seat for movement transversely of the cab; yet a further feature of the invention is that latch means are provided for holding the seat in its operative position; and yet another feature of the invention is that at least a portion of the seat projects outside the cab through the open side cab door when the seat has been moved to inoperative position to provide access to the engine compartment.

Other features and advantages of the invention will be apparent from the following description and from the drawings, in which:

Fig. 1 is a side elevational view of a cab-over-engine truck incorporating the invention;

Fig. 2 is an enlarged side elevational view of the cab, parts being broken away to show underlying structure, the seat being in inoperative position and the engine compartment cover being shown in open position;

Figure 3:
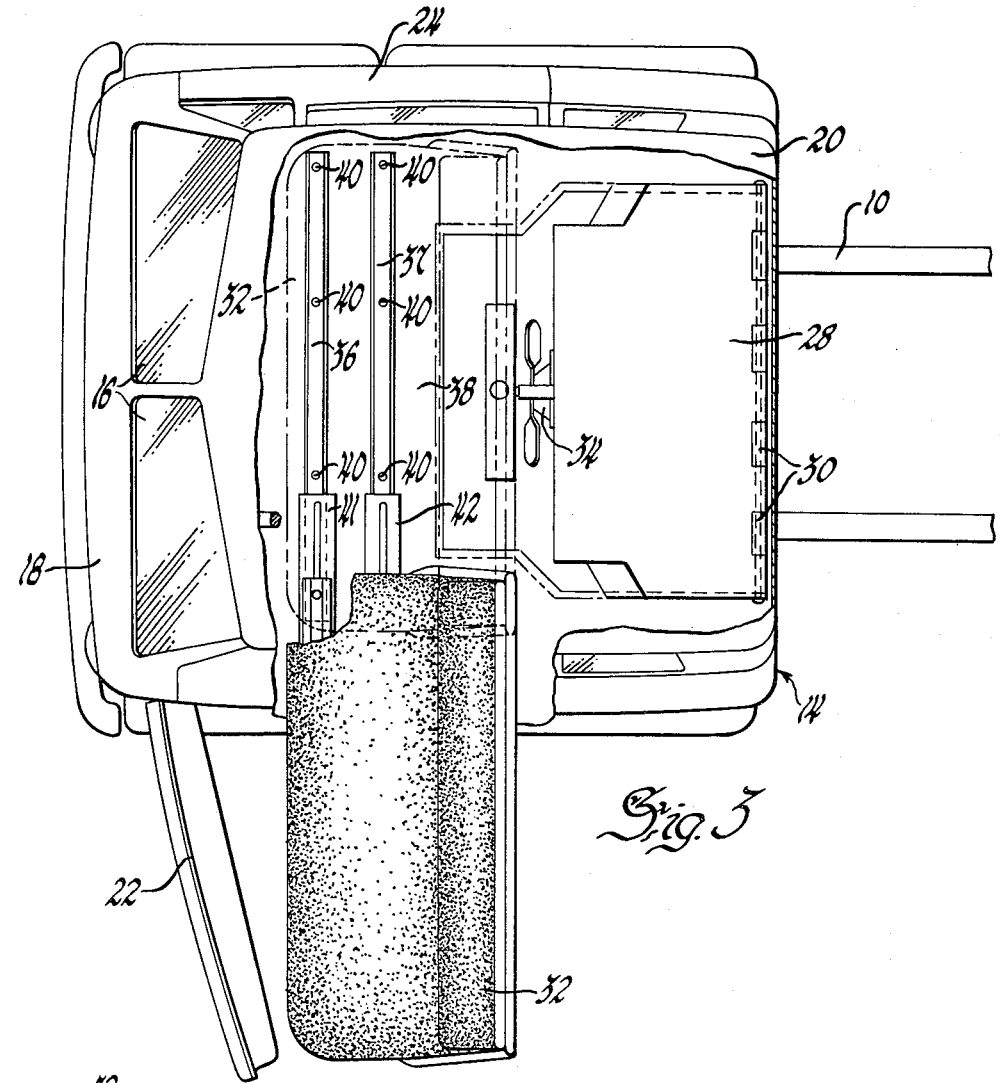
Fig. 3 is a top plan view into the cab with the roof removed, the seat being shown in solid lines in its inoperative position and in broken lines in its operative position.

Because of their compact structure, so called cab-over-engine trucks have become increasingly popular. In this type of cab construction the engine is mounted in a compartment rearwardly of and generally below the operator's seat. Not only does this shorten the driving connection between the engine and the wheels, but it also makes possible a shorter overall cab length, making a larger pay load possible with a given overall length of cab and chassis.

Cab-over-engine construction has certain disadvantages, particularly in that the engine is relatively inaccessible for repair and adjustment. Attempts have been made to solve this problem by mounting the cab so that it may be tilted forwardly to provide unimpeded access to the engine compartment. Such tilting cab construction is costly and adds weight to the cab construction.

This invention provides a novel and improved means of providing unimpeded access to the engine compartment. According to the invention, the seat is movably supported on tracks in the cab, said tracks extending transversely of the cab forwardly of the engine compartment so that the seat can be slid partially or entirely out of the cab through the open side door thereof to provide unimpeded access to the engine compartment. If desired, the seat can be removed entirely from the tracks or it can be left on the tracks in an inoperative position wherein the seat projects through the open door of the cab as shown in solid lines in Fig. 3 of the drawings.

Referring now more particularly to the drawings, the truck illustrated therein has a chassis 10 from which are suspended ground wheels 12 and upon which is mounted a driver's cab shown generally at 14. The cab has a front windshield 16 mounted between a cowl 18 and a roof 20, and opposite side doors 22 and 24 are hingedly mounted on the cab body in conventional manner.

In the lower rear portion of the cab, there is an engine compartment 26 having a top cover 28 hingedly mounted along its rear edge at 30 providing a top opening from the engine compartment 26 into the cab. In Fig. 2 this cover is shown in open position, and it will be seen that the driver's seat 32 (which includes a cushion and a seat back) is so located that normally it interferes with access to the engine compartment 26 so that, with the seat in its normal operative position, it would be very difficult to work on the engine 34 which is mounted in the engine compartment.

Seat supporting track means in the cab extend transversely of the cab forwardly of the engine compartment, and the seat 32 is mounted on this track means for movement therealong between an operative driving position in the cab and an inoperative position providing access to the engine compartment when the compartment cover 28 is open.

Figure 4:
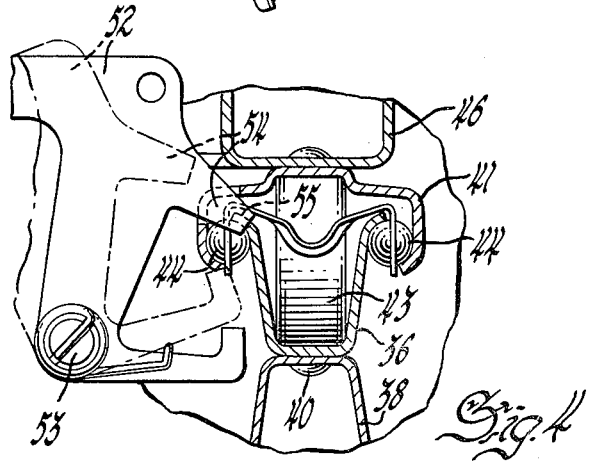
Fig. 4 is an enlarged detail section through one of the seat supports and the seat latch.

The seat tracks include a pair of floor supports or rails 36 and 37 which extend in parallel relationship transversely of the cab forwardly of the engine compartment. As shown in Figs. 3 and 4 these rails are secured to the floor 38 of the cab by bolts 40. The floor supports 36, 37 are in the form of channel members having outwardly turned flanges on each lateral arm. Movably mounted on each of the floor supports 36 and 37 is a slide member 41 and 42, respectively, each of these members being in the form of an inverted channel having an inwardly turned flange at the edge of each arm. A plurality of rollers 43 are mounted between the track assembly members 36, 41, and similar rollers are mounted between the track assembly members 37, 42. These rollers take the load and provide for sliding movement of the seat slide along the stationary floor supports. Balls 44 hold the slides in proper alignment on the stationary rails and prevent side sway.

Atop the seat slide 41 there is affixed a channel 46 and a similar channel 48 is affixed atop the rear slide 42. These channels are secured to the underside of a seat frame 50 so that the seat is slidable between an operative position in the cab shown in broken lines in Fig. 3 and an inoperative position shown in solid lines in Fig 3 wherein a portion of the seat projects out through the open door 22 of the cab. If desired, the seat can be slid in the opposite direction out through the right hand door 24 when this door is open. When the seat is in its inoperative position, unimpeded access may be had to the engine compartment and the cover 28 of the engine compartment may be raised to expose the engine.

In order to hold the seat in its operative position, latch means are provided including a handle 52 which is pivotally mounted at 53 on a bracket on the movable slide 41 and which projects forwardly through an opening in the front flange of the seat frame 50. The latch handle 52 has a latching tooth 54 which is adapted to engage a notch 55 in the front flange of the stationary rail 36 to hold the seat in its operative position. This latch is conventional and well known for use with seat adjusters.

If fore and aft adjustment of the seat is desired, the stationary rails 36 and 37 may be mounted on any conventional type of fore and aft seat adjuster rather than being mounted directly on the floor of the automobile. Since such a means of fore and aft seat adjustment is well understood in the art, it is not illustrated.

While I have shown and described one embodiment of my invention, it is capable of many modifications. Changes, therefore, in the construction and arrangement may be made without departing from the spirit and scope of the invention as set forth in the appended claims.

I claim:

1. In combination in a motor truck, a driver's cab having a floor and a side opening with a door swingably mounted therein; an engine compartment beneath said floor, the floor having an opening providing access to said compartment; seat supporting track means in said cab extending transversely of the cab forwardly of said compartment opening; and a driver's seat mounted on said seat track means for movement therealong between an operative driving position in the cab wherein said seat blocks access to the engine compartment and an inoperative position providing access to said compartment through said opening.

2. In combination in a motor truck, a driver's cab having a floor and a side opening with a door swingably mounted therein; an engine compartment beneath said floor, the floor having an opening providing access to said compartment; seat supporting track means in said cab extending transversely of the cab forwardly of said compartment opening; a driver's seat mounted on said seat track means for movement therealong between an operative driving position in the cab wherein said seat blocks access to the engine compartment and an inoperative position providing access to said compartment through said opening; and latch means for holding said seat on said track means in operative position.

3. In combination in a motor truck, a driver's cab having a floor and a side opening with a door swingably mounted therein; an engine compartment beneath said floor, the floor having an opening providing access to said compartment; a cover for said compartment opening; means mounting said cover in the cab for movement between a first position closing said compartment opening and a second position away from said compartment opening; seat supporting track means extending transversely of the cab forwardly of said compartment opening; and a driver's seat mounted on said track means for movement therealong between an operative driving position in the cab wherein said seat blocks access to the engine compartment and prevents movement of said cover from its first position to its second position and an inoperative position wherein said seat extends at least part way out of the cab through said side opening to provide access to the engine compartment and to permit the cover to be moved to its second position.

4. In combination in a motor truck, a driver's cab having a floor and a side opening with a door swingably mounted therein; an engine compartment beneath the rear portion of said floor, the floor having an opening providing access to said compartment; a cover for said compartment opening; means pivotally mounting the cover in the cab for swinging movement between a first position closing said compartment opening and a second position away from said compartment opening; a pair of seat supporting tracks in said cab in alignment with said side opening and extending in parallel relationship transversely of the cab forwardly of said compartment opening; a driver's seat mounted on said tracks for movement therealong between an operative driving position in the cab wherein said seat blocks access to the engine compartment and prevents swinging movement of said cover from its first position to its second position and an inoperative position wherein said seat extends at least part way out of the cab through said side opening to provide access to the engine compartment and to permit the cover to be swung to its second position.

5. In combination in a motor truck, a driver's cab having a floor and a side opening with a door swingably mounted therein; an engine compartment beneath the rear portion of said floor, the floor having an opening providing access to said compartment; a cover for said compartment opening; means pivotally mounting the cover in the cab for swinging movement between a first position closing said compartment opening and a second position away from said compartment opening; an engine in said compartment; a pair of seat supporting tracks in said cab in alignment with said side opening and extending in parallel relationship transversely of the cab forwardly of said compartment opening; a driver's seat mounted on said tracks for movement therealong between an operative driving position in the cab wherein said seat blocks access to the engine compartment and prevents swinging movement of said cover from its first position to its second position and an inoperative position wherein said seat extends at least part way out of the cab through said side opening to provide access to the engine compartment and to permit the cover to be swung to its second position; and latch means for holding said seat in operative position.

References Cited in the file of this patent

UNITED STATES PATENTS

| | | |
|---|---|---|
| 2,064,100 | Bachman | Dec. 15, 1936 |
| 2,154,011 | Reinoehl et al. | Apr. 11, 1939 |
| 2,670,987 | Walsh | Mar. 2, 1954 |
| 2,700,428 | Nallinger | Jan. 25, 1955 |